United States Patent [19]

Gallistru et al.

[11] 4,146,575

[45] Mar. 27, 1979

[54] PREPARATION OF SODIUM TRIPOLYPHOSPHATE

[75] Inventors: Onorio Gallistru, Busto Arsizio (Varese); Artemio Gellera; Luciano Cavalli, both of Milan, all of Italy

[73] Assignee: Euteco S.p.A., Milan, Italy

[21] Appl. No.: 848,422

[22] Filed: Nov. 3, 1977

[30] Foreign Application Priority Data

Nov. 19, 1976 [IT] Italy ................... 29543 A/76

[51] Int. Cl.$^2$ .................. C01B 15/16; C01B 25/26; C01B 25/16
[52] U.S. Cl. .................. 423/315; 423/309; 423/313; 423/321 R
[58] Field of Search .............. 423/315, 321 R, 309, 423/313

[56] References Cited

U.S. PATENT DOCUMENTS

| | | | |
|---|---|---|---|
| 1,825,965 | 10/1931 | Lang | 423/309 |
| 1,998,182 | 4/1935 | Anable et al. | 423/313 |
| 3,081,151 | 3/1963 | Marty | 423/313 |
| 3,421,845 | 1/1969 | Peterson | 423/309 |
| 3,423,170 | 1/1969 | Edwards | 423/313 |

*Primary Examiner*—O. R. Vertiz
*Assistant Examiner*—Gregory A. Heller
*Attorney, Agent, or Firm*—Sughrue, Rothwell, Mion, Zinn and Macpeak

[57] ABSTRACT

The purity grade of sodium tripolyphosphate obtained by neutralization with sodium hydroxide of aqueous phosphoric acid obtained by the wet method, removal of the precipitate formed, evaporation to dryness of the resulting solution and calcination of the evaporation residue, is improved by carrying out the neutralization at a temperature not exceeding 85° C., maturing the neutralization product at 70°–85° C. for at least one hour before separating the precipitate, concentrating the sodium phosphate solution, if necessary, to a sodium phosphate content of at least 40 wt.%, and heat treating the solution at 100°–200° C. and at boiling point or under to precipitate the magnesium compounds, prior to the evaporation step.

12 Claims, No Drawings

PREPARATION OF SODIUM TRIPOLYPHOSPHATE

The present invention concerns the production of sodium tripolyphosphate of very high purity, from aqueous phosphoric acid obtained by the wet method.

The alkali metal tripolyphosphates, and especially sodium tripolyphosphate, are widely used as sequestering agents in detergent compositions and in other cleansing agents, and for such uses products are required with very low quantities of contaminants.

In the art sodium tripolyphosphate is obtained by a process which generally includes the following series of stages:
— the phosphoric acid solution is neutralized with aqueous sodium hydroxide up to a neutral, or about neutral pH and the precipitated impurities resulting from this neutralising treatment are filtered off;
— the filtered solution is concentrated, if necessary, and the concentrated solution is filtered;
— the water is removed by evaporation to dryness, and finally the evaporation residue is calcined.

When, in the process under discussion, phosphoric acid produced by the wet method, that is by attack of phosphate minerals by sulphuric acid, is used, it is not easy to manufacture sodium tripolyphosphate with acceptable qualities of purity.

This is due to the presence of numerous impurities arising from the phosphate mineral, some of which cannot be satisfactorily removed before the neutralising treatment or during the said treatment.

Thus, for example, magnesium compounds are usually present in the solution sent for drying in amounts of about 1500–3000 ppm (as metal) with respect to the $P_2O_5$ content of said solution, and the removal of said compounds is particularly difficult.

Other polluting impurities are the calcium, iron, aluminium, nickel and chromium compounds.

According to the present invention the content of polluting metals in the sodium tripolyphosphate is reduced to negligibly low values when, in the process indicated, special expedients are observed in the neutralisation stage of the acid and when the sodium phosphate solution is treated thermally at high temperatures before dispatch to the drying stage.

Thus, the invention provides a process for the preparation of sodium tripolyphosphate wherein an aqueous solution of phosphoric acid obtained by the wet method is neutralized by addition of an aqueous solution of sodium hydroxide, the precipitated impurities are separated from the sodium phosphate solution thus obtained, the sodium phosphate solution is evaporated to dryness and the evaporation residue is calcined, characterized in that said aqueous solution of phosphoric acid is neutralized at a temperature not exceeding 85° C., the neutralization product is left to mature at a temperature of from 70° to 85° C. for a period of at least one hour before separating said precipitated impurities, the sodium phosphate solution is concentrated, if necessary, to bring its sodium phosphate content to a value of at least 40% by weight, with separation of the precipitated impurities thus obtained from the resulting concentrated solution, and the sodium phosphate solution, having a sodium phosphate content of at least 40% by weight, is submitted, prior to the evaporation to dryness, to a heat treatment at a temperature of from 100° to 200° C., at boiling point or under, and at atmospheric or superatmospheric pressure, for a period such as to induce substantially complete precipitation of the magnesium compounds dissolved in said sodium phosphate solution, the precipitate resulting from this heat treatment being separated from the heat treated solution.

It has been suggested in the prior art to submit the sodium phosphate solutions to a thermal treatment and to concentrate the thus treated solution to a $P_2O_5$ content of about 30% by weight, to improve the purity of the solution before dispatch to the drying stage.

However, this thermal treatment was carried out at relatively low temperatures on solutions having a low $P_2O_5$ content, that is under conditions such that the objects of the present invention were not achieved, taking also into account the fact that no special precaution was taken in the neutralization stage.

By operating in accordance with the process of the present invention, the content of residual magnesium in the solution sent for drying or equivalently in the sodium tripolyphosphate, is generally reduced to values not exceeding 250 ppm and typically of 100–250 ppm (as metal) with reference to the $P_2O_5$ content. At the same time the content of other polluting metals is reduced to negligibly low values.

As is known in the art, the aqueous phosphoric acid obtained by the wet method, having generally a $P_2O_5$ content of the order of 30–50% by weight, is conveniently purified, before the neutralisation treatment, precipitating the sulphate ions by the addition of a barium salt (e.g. barium carbonate) and reducing the vanadium and chromium salts by adding a suitable reducing agent (for example powdered iron). Treatment with activated carbon, or other material, in order to remove organic substances which are present in the acid solution is also advantageous. These purification treatments are generally carried out at a temperature of the order of 60°–70° C.

The phosphoric acid solution thus purified is neutralised with aqueous sodium hydroxide, generally up to a neutral or about neutral pH, and according to the present invention the temperature at which the said neutralisation is carried out is critical.

More particularly the neutralisation is carried out at a temperature not exceeding 85° C. and generally at a temperature of from 70° to 85° C. with optimal values of the order of 80° C.

Preferably, aqueous sodium hydroxide with a concentration of 40–50% by weight is added to the phosphoric acid solution kept under thorough agitation. The addition takes place slowly and gradually, keeping the temperature of the mass within the desired range of values and avoiding as far as possible local overheatings which may occur in the regions in which the reagents come into contact.

Neutralisation may be carried out in a single stage or in several distinct stages. According to a preferred embodiment this is carried out by first adding aqueous sodium hydroxide up to a quantity corresponding to that necessary for the formation of monosodium phosphate.

Under these circumstances the pH of the reaction medium is brought to a value of the order of 3.8–4 and conditions suitable for the precipitation of divalent iron and aluminium in the form of phosphates are achieved.

Neutralisation is then completed by adding aqueous sodium hydroxide up to a $Na_2O/P_2O_5$ ratio of the order of 1.65–1.70, corresponding to the formation of 2 moles of disodium phosphate for each mole of monosodium phosphate. When this concentration is reached the pH of the medium is of the order of 6.7–6.8 and precipitation of the calcium and of part of the magnesium in the form of phosphates occurs.

All these operations are carried out by maintaining the temperature at the values shown and by following the procedure previously indicated.

According to the present invention the neutralised product is matured at a temperature of from 70° C. to 85° C. for at least one hour.

The maximum maturing period is not critical and depends essentially upon economic considerations. It has been established that periods of the order of 2–3 hours generally give satisfactory results.

By heating the neutralised product in this manner, the precipitate will be easily and completely filterable and the resulting solution of sodium phosphates can subsequently be subjected to the other treatments for producing sodium tripolyphosphate with a high degree of purity.

It has in fact been established that the absence of maturation, or the use of temperatures different from those indicated for the maturation of the neutralisation product, or else imperfect filtration of the latter, yield sodium phosphate solutions from which it is then difficult to separate magnesium compounds and the other polluting metals.

In the case in which neutralisation is carried out in two distinct stages as previously indicated, each stage is followed by maturation under the conditions previously indicated.

The solution, after separation of the precipitate, is generally concentrated to bring its sodium phosphate content to a value of at least 40% by weight, and generally from 40% to 50% by weight, and during this treatment further precipitation of the magnesium, iron, calcium and aluminium compounds may occur. Concentration may not prove necessary when the neutralized solution contains from 40% to about 50% by weight of sodium phosphates.

In each case the said solution (either concentrated or not) contains magnesium compounds in amounts typically of the order of 1500–3000 ppm (as metal) with reference to the $P_2O_5$ content, as well as significant amounts of compounds of the other polluting metals, such as chromium, calcium, iron, aluminium and nickel compounds.

According to the present invention the said solution of sodium phosphates is then subjected to a thermal treatment at a temperature of from 100° to 200° C. at boiling point or under, possibly under pressure, and the treatment is continued until the precipitation of the salts of the polluting metals is substantially complete.

More particularly the higher the chosen temperature and the greater the concentration of the sodium phosphates in the solution subjected to treatment, the shorter will be the heating period.

Thus, for example, with a sodium phosphate content of the order of 40% by weight good precipitation is obtained by maintaining boiling at atmospheric pressure for two hours, whilst under the same temperature conditions solutions with a sodium phosphate content of the order of 50% by weight require periods of about 30 minutes. An increase in treatment temperature permits a corresponding decrease in treatment period to be obtained.

The thermal treatment should not be carried out for periods exceeding substantially the maximum times for the substantially complete precipitation of the magnesium compounds. Excessively long periods may in fact result in partial redissolving of the precipitate.

In any case it is preferably to operate at superatmospheric pressure and at a temperature higher than the boiling temperature of the sodium phosphate solution at atmospheric pressure, since under these conditions shorter treatment times are required and a more easily filterable precipitate is obtained.

In each case the precipitate thus obtained is separated, generally by filtration, and the resulting solution is dried according to known methods.

Calcination of the residue is then carried out, generally at 400°–500° C., with consequent formation of sodium tripolyphosphate.

By operating according to the present invention the magnesium content in the said tripolyphosphate is reduced to values typically of the order of 100–250 ppm and the contents in ppm of the other impurities are typically the following: calcium 70, iron 3, aluminium 10, nickel 25 and chromium 3.

The contents are in each case calculated as metal and with reference to the $P_2O_5$ content of the sodium phosphate solutions sent to drying, or else of the sodium tripolyphosphate.

These results are only obtained when the operation conditions described are respected both in the stage of neutralisation of the acid, and also in that of thermal treatment of the sodium phosphate solution.

In the following experimental Examples, an aqueous solution of phosphoric acid obtained by the wet method, having a 45% concentration by weight, is conventionally treated with barium carbonate, iron filings and activated carbon, as is known in the art.

After decanting and separation of the precipitate, the acid solution is neutralised in a first stage with a 50 wt.% aqueous solution of sodium hydroxide, up to a $Na_2O/P_2O_5$ ratio of about 1. Neutralisation is then carried out in a second stage up to a $Na_2O/P_2O_5$ ratio of about 1.7.

After filtration of the precipitate the aqueous solution is recovered with a sodium phosphate content of the order of 30–40% by weight.

The said solution is subjected to a thermal treatment, either as it is, or after concentration by evaporation of water and subsequent filtration. The concentration is carried out at subatmospheric pressure, at a temperature less than 80° C. until the sodium phosphate content is brought to the desired value.

The precipitate resulting from the thermal treatment is then separated and the heat treated solution is evaporated to dryness.

Finally the evaporation residue is calcined.

EXAMPLE 1

Operating as hereinbefore described, the phosphoric acid solution is neutralised with aqueous sodium hydroxide at 80° C. up to a $Na_2O/P_2O_5$ ratio of about 1 and is then left to mature for three hours at 80° C.

Neutralisation up to a $Na_2O/P_2O_5$ ratio of about 1.7 is then carried out and the solution is left to mature for two hours at 80° C.

The neutralisation is carried out by adding the aqueous sodium hydroxide slowly and gradually to the phosphoric acid solution and keeping the mass under vigorous agitation.

The precipitate is filtered off and a solution with a sodium phosphate content of 30.91% by weight is obtained. The solution is divided into three fractions. The first fraction is not concentrated, while the second fraction is concentrated by evaporating the water at subatmospheric pressure and at a temperature below 80° C. up to a sodium phosphate content of 40.25%, and the third fraction is concentrated under the same conditions up to a content of 47.8% by weight.

The three fractions are heat treated at atmospheric pressure and at boiling point (103°–110° C.) and the content of polluting metals still dissolved in these solutions after different heating periods is determined.

More particularly the results obtained with the first fraction are shown in Table 1, those obtained with the second fraction in Table 2, and those obtained with the third fraction in Table 3.

The contents of polluting metals are expressed in parts per million and refer to the $P_2O_5$ content in the said solutions.

Table 1

| Time (minutes) | Ca | Mg | Fe | Al | Ni | Cr |
|---|---|---|---|---|---|---|
| 0 | 460 | 2920 | 37 | 28 | 56 | 12 |
| 60 | 460 | 2920 | 29 | 28 | 56 | 11 |
| 120 | 435 | 2920 | 32 | 23 | 53 | 10 |
| 180 | — | 2800 | — | — | — | — |
| 300 | — | 2850 | — | — | — | — |

Table 2

| Time (minutes) | Ca | Mg | Fe | Al | Ni | Cr |
|---|---|---|---|---|---|---|
| 0 | 524 | 3360 | 36 | 27 | 52 | 14 |
| 30 | 436 | 2860 | 29 | 21 | 52 | 10 |
| 60 | 378 | 2360 | 16 | 24 | 52 | 9 |
| 120 | 72 | 225 | 4 | 13 | 27 | 4 |
| 180 | 56 | 144 | 4 | <10 | 23 | 3 |
| 240 | 73 | 205 | 2 | <10 | 23 | 2 |

Table 3

| Time (minutes) | Ca | Mg | Fe | Al | Ni | Cr |
|---|---|---|---|---|---|---|
| 0 | 422 | 3454 | 32 | 26 | 60 | 12 |
| 15 | 89 | 238 | 6 | <10 | 36 | 6 |
| 30 | 60 | 194 | 6 | <10 | 29 | 4 |
| 60 | 60 | 129 | 6 | <10 | 24 | 4 |
| 90 | 50 | 104 | 6 | <10 | 24 | 4 |
| 120 | 67 | 122 | 3 | <10 | 24 | 4 |

EXAMPLE 2

The second and third fractions of Example 1 having respectively a sodium phosphate content of 40.25% and 47.8% by weight are heated at 180° C. under a pressure such as to prevent boiling, for a period of about 15 minutes.

Finally the filtration of the precipitate is carried out, and the residual solution has a magnesium content of 231 ppm in the case of the second fraction and 211 ppm in the case of the third fraction.

EXAMPLE 3

Operating as in Example 1, the phosphoric acid solution is neutralised at 100° C. and left to mature at the same temperature.

After filtration of the precipitate the solution is concentrated up to a sodium phosphate content of 37.7% by weight.

This solution is boiled at atmospheric pressure and the content of polluting metals dissolved in the said solution after different heating periods is determined.

The results are summarised in Table 4.

Table 4

| Time (minutes) | Ca | Mg | Fe | Al | Ni | Cr |
|---|---|---|---|---|---|---|
| 0 | 580 | 1860 | 130 | 240 | 45 | 15 |
| 30 | 580 | 1860 | 130 | 240 | 45 | 15 |
| 60 | 580 | 1860 | 130 | 240 | 45 | 15 |
| 120 | 580 | 1860 | 120 | 240 | 45 | 15 |
| 180 | 560 | 1860 | 120 | 240 | 45 | 15 |

We claim:

1. In a process for the preparation of sodium tripolyphosphate wherein an aqueous solution of phosphoric acid obtained by the wet method which contains magnesium compounds dissolved therein is neutralized by addition of an aqueous solution of sodium hydroxide, the precipitated impurities are separated from the sodium phosphate solution thus obtained, the sodium phosphate solution is evaporated to dryness and the evaporation residue is calcined, the improvement which comprises neutralizing said aqueous solution of phosphoric acid at a temperature not exceeding 85° C., maturing the neutralization product at a temperature of from 70° to 85° C. for a period of at least one hour before separating said precipitated impurities, submitting the sodium phosphate solution, having a sodium phosphate content of at least 40% by weight, prior to the evaporation to dryness, to a heat treatment at a temperature of from 100° to 200° C., at boiling point or under, and at atmospheric or superatmospheric pressure, for a period such as to induce substantially complete precipitation of the magnesium compounds dissolved in said sodium phosphate solution, the precipitate resulting from this heat treatment being separated from the heat treated solution.

2. The process of claim 1, in which the solution of phosphoric acid is neutralized at a temperature of from 70° to 85° C.

3. The process of claim 1, in which said neutralisation product is left to mature for a period of from 2 to 3 hours.

4. The process of claim 1, in which the solution of phosphoric acid is neutralized in two stages, sodium hydroxide being added in the first stage in an amount necessary for the formation of monosodium phosphate, and in the second stage in an amount necessary for the formation of 2 moles of disodium phosphate for each mole of monosodium phosphate, the product obtained after each stage being left to mature at a temperature of from 70° to 85° C. for a period of at least one hour.

5. The process of claim 1, in which the sodium phosphate solution is concentrated at a temperature less than 80° C. and at subatmospheric pressure.

6. The process of claim 1, in which the sodium phosphate solution submitted to said heat treatment has a sodium phosphate content of from 40 to 50% by weight.

7. The process of claim 1, in which said heat treatment is carried out for a period such as to obtain in the sodium phosphate solution a magnesium content not exceeding 250 ppm, with respect to the $P_2O_5$ content of said solution.

8. The process of claim 7, wherein said magnesium content is from 100 to 250 ppm.

9. The process of claim 1, wherein prior to submitting the sodium phosphate solution to said heat treatment at a temperature of from 100 to 200° C. said sodium phosphate solution is concentrated to a sodium phosphate content of at least 40% by weight, with separation of precipitated impurities thus obtained from the resulting concentrated solution.

10. The process of claim 7, wherein said magnesium compounds are initially present in an amount of about 1500–3000 ppm, as metal, with respect to the $P_2O_5$ content of the aqueous solution of phosphoric acid.

11. The process of claim 4, wherein in the first stage of said neutralizing the pH is brought to a value on the order of 3.8–4, and during the second stage the pH is brought to a value on the order of 6.7–6.8, divalent iron and aluminum in the form of phosphates precipitating during said first stage and precipitation of calcium present and a part of the magnesium present in the form of phosphates occuring during said second stage.

12. The process of claim 1, wherein further impurities initially present include calcium, iron, aluminum, nickel and chromium, the contents thereof being reduced during said process.

* * * * *